United States Patent Office

2,729,623
Patented Jan. 3, 1956

2,729,623

AIR-DRYING RESIN MADE FROM ALLYLIC ALCOHOL, AN OXIRANE AND AN UNSATURATED DIBASIC ACID

Robert A. Gregg, Passaic, N. J., assignor to United States Rubber Company, New York, N. Y., a corporation of New Jersey No Drawing. Application March 10, 1951,
Serial No. 215,021

5 Claims. (Cl. 260—78.5)

This invention relates to an improved method of making air-drying resins. In particular, the present invention involves reacting an allylic alcohol with an oxirane in critical molar proportions, directly esterifying the resulting alcohol mixture with an alpha-ethylenic alpha, beta-dicarboxylic acid, especially fumaric acid or a mixture of fumaric and maleic acids, the ratio of moles of alcohols per acid equivalent presented by the acid being within certain critical limits, and directly polymerizing the resulting ester mixture to obtain a soluble, unsaturated resin which is air-drying, i. e., can be cured to a solvent- and heat-resistant state in the presence of oxygen, e. g. air, and at moderate temperatures, e. g., 25° C.

Certain beta-2-alkenoxyalkyl esters, e. g., di-(beta-allyloxyethyl) fumarate, are known to yield air-drying resins which are of great potential importance as wood finishes. However, the commercial utility of such compositions has been seriously handicapped by two factors: (1) the excessive preparative cost of the ester itself and (2) the tendency of the ester to polymerize to an insoluble, intractable gel before more than a minor proportion of the monomeric ester has been converted to the polymeric form.

The high preparative cost of the ester is inherent in the initial step involving the condensation of the allylic alcohol with the oxirane, e. g., ethylene oxide. In this reaction the optimum yield of the desired beta-2-alkenoxyalkanol is obtained only when a very large excess of the allylic alcohol is employed. At the conclusion of the reaction and prior to the subsequent esterification, a large residual amount of the allylic alcohol was, in prior practice, separated from the desired product and purified and recycled for use in subsequent reactions. On the other hand, if smaller amounts of the allylic alcohol are used, the yield of the beta-2-alkenoxyalkanol is markedly decreased and increasing amounts of higher condensation products, e. g., beta-allyloxyethoxyethanol, are formed, so that the desired beta-2-alkenoxyalkanol must be fractionally distilled in order to separate it from both the unreacted allylic alcohol and the higher condensation products. Moreover, when the beta-2-alkenoxy-alkanol itself was purified it was thereafter esterified and the resulting ester was then distilled to remove any unreacted starting materials, prior to polymerization. Distillation of such reactive and high-boiling esters inevitably brings about considerable losses due to premature polymerization.

I have now discovered a process whereby the necessity of distilling the intermediate beta-2-alkenoxyalkanol produced by the condensation of the allylic alcohol with the oxirane is completely eliminated and yet air-drying resins are obtained. The method of my invention is further characterized by the fact that it completely eliminates the necessity of isolating the esters formed by the esterification of the beta-2-alkenoxyalkanol containing material with the unsaturated dibasic acids.

My invention is based on the discovery that if the molar ratio of allylic alcohol to oxirane in the reaction mixture in which the beta-2-alkenoxyalkanol is formed is from 1:1 to 5:1, a soluble, convertible, unsaturated air-drying resin is obtained by direct esterification of the resulting alcohol mixture with an aliphatic ethylene-alpha, beta-dicarboxylic acid followed by direct polymerization of the ester mixture obtained, without the necessity of distilling the reaction products (oxy-alcohols) resulting from the condensation of the allylic alcohol with the oxirane, or of separating the reaction mixture resulting from esterification of the beta-2-alkenoxyalkanol-containing mixture.

In the practice of my invention it is essential that the molar ratio of allylic alcohol to oxirane be so controlled as to be within the above limits in order to achieve a proper balance and give an air-drying resin despite elimination of intermediate purification steps. This ratio is critical. If a molar ratio less than about 1:1 is employed, the resulting alcohol mixture contains an excessive proportion of higher condensation products. Thus, beta-allyloxyethoxyethanol, formed as a result of condensation of additional oxirane with the first reaction product formed, namely, the beta-2-alkenoxyalkanol, reacts with still more oxirane, and so on. If, on the other hand, a molar ratio higher than about 5:1 is used, the resulting alcohol mixture contains such a high proportion of unreacted allylic alcohol that, upon esterification, the ester mixture contains such a proportion of allylic ester of the dibasic acid that it is incapable of yielding a practical air-drying resin.

A practical air-drying resin is not obtained when the molar ratio of the allylic alcohol to the oxirane is less than about 1:1 or greater than about 5:1, if the intermediate steps of purification are omitted. Such purification adds to the processing cost and lowers the yield and quality of the products. The deterioration in quality is caused by the inevitable decomposition of the high boiling products during distillation. Therefore, elimination of such purification is a highly desirable feature of my invention.

Where allyl alcohol and ethylene oxide are used, I often prefer to employ them in a molar ratio of allyl alcohol to ethylene oxide of from 1.8:1 to 1.9:1, for example, 1.85:1.

I have further discovered that if the esterification reaction is carried out with considerably less than one acid equivalent, presented by the unsaturated dibasic acid, per mole of alcohols present in the mixture resulting from the condensation with the oxirane, or, more specifically, if the esterification is carried out with a ratio of moles of alcohols in such mixture to acid equivalents presented by the dibasic acid of from about 1.3:1 to about 2.0:1, polymerization of the esters during the esterification reaction is suppressed, and subsequent polymerization of the ester product yields an unexpectedly large percentage of soluble polymer before the gelation point is reached. This effect is attributed to the presence of unesterified, unsaturated copolymerizable alcohols, particularly the allylic alcohol and, to a lesser extent, the beta-2-alkenoxyalkanol and higher condensation products, e. g. beta-allyloxyethoxyethanol and similar higher alcohols having the formula

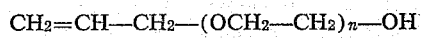

where $n$ is an integer of from 1 to 5. These alcohols not only copolymerize with the esters present but also avert or delay gelation to such an extent that markedly higher proportions of monomeric esters can be converted to the soluble polymeric form than is the case when the isolated pure beta-2-alkenoxyalkyl ester of the dibasic acid is polymerized. The gelation-suppressing effect of the unesterified alcohols is exerted both during the esterification, when some polymerization is apt to occur, and during subsequent polymerization as indicated above. The unesterified allylic alcohol exerts a far greater gelation-suppressing effect than the beta-2-alkenoxyalkanol and higher condensation products, the effect of which is almost negligible. However, as will appear more fully below, the beta-2-alkenoxyalkanol and beta-2-alkenoxyalkoxyalkanol impart the air-drying properties to my polymers.

Where allyl alcohol and ethylene oxide are reacted in a molar ratio of from 1.8:1 to 1.9:1 and the resulting reaction mixture is esterified with fumaric acid or maleic acid or a mixture of the two, I often prefer to use such relative proportions of first reaction mixture and acid that the ratio of moles of alcohols to equivalents of acid is from 1.4:1 to 1.6:1, for example about 1.5:1.

The gelation-suppressing effect just mentioned can be enhanced by adding further quantities of allylic alcohol to the polymerizable mixture resulting from the esterification. The amount of allylic alcohol so added preferably is such that the amount of free allylic alcohol present during the polymerization is from 1 to 8 moles per mole of polymerizable esters. As the amount of such alcohol added is increased within this range, the extent of the conversion of the esters to soluble interpolymers is increased and in this way it is possible to convert the major portion of the ester mixture to the soluble interpolymeric form without danger of gelation. Thus, the second disadvantage heretofore encountered in the use of beta-2-alkenoxyalkyl esters of ethylene-alpha, beta-dicarboxylic acids, namely, the low yields of soluble unsaturated polymer, is eliminated by the use of my invention.

It will be seen that by my invention a large proportion of the time and labor expended in preparing and purifying beta-2-alkenoxyalkanols and dibasic esters thereof is eliminated by directly esterifying the crude reaction mixture from the condensation of the allylic alcohol and the oxirane with the unsaturated dibasic acid or mixture of such acids and thereafter employing the esterified mixture directly in the polymerization reactions.

As used herein and in the claims appended hereto, the term "directly" as applied to the esterifying step and the polymerizing step means that the organic mixtures in question resulting from a preceding step are used as such without substantial resolution of the products. However, the separation or neutralization of catalysts present in such reaction mixtures is not precluded by this expression, nor is the removal of some unreacted allylic alcohol, and these steps are in fact often desirable before proceeding with the next step of my process.

In a typical embodiment of the practice of my invention, from 1 to 5 mols of allylic alcohol are reacted with one mole of an oxirane, especially a lower oxirane such as ethylene oxide, propylene oxide, 1,2-butylene oxide or 2,3-butylene oxide, by heating the mixture at an elevated temperature, such as in the range of from 40° to 100° C., and for from 1 to 10 hours, preferably in the presence of an ionic catalyst of the class including acidic materials, such as boron trifluoride etherate, and sulfuric acid, and basic materials such as alkali metal alkoxide, e. g., sodium methoxide and sodium ethoxide. However, where methallyl alcohol is used, it is preferred to effect the reaction under alkaline conditions, because methallyl alcohol is easily isomerized to isobutyraldehyde in the presence of acidic catalysts.

It is often preferred to introduce the oxirane gradually, either intermittently or continuously, during the first portion of the reaction period. This is particularly true where a normally gaseous oxirane such as ethylene oxide is employed. Following introduction of the oxirane the reaction may be continued until it has substantially attained completion. It is often preferred to carry out the condensation under refluxing conditions. While it is usually preferred to carry out the reaction at atmospheric pressure, superatmospheric pressures may be used.

The allylic alcohol used in the practice of the present invention has the type formula

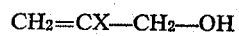

$$CH_2=CX-CH_2-OH$$

wherein X is either hydrogen, chlorine, methyl or ethyl.

The oxirane employed is usually either ethylene oxide or propylene oxide because these are cheap and readily available. However any compound having the formula

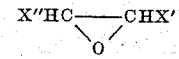

$$\underset{\diagdown O \diagup}{X''HC-CHX'}$$

wherein each of X' and X'' is either hydrogen or alkyl, especially alkyl ranging from methyl to butyl, may be used.

After the reaction between the allylic alcohol and the oxirane has attained the desired degree of completion, usually after the oxirane has been substantially completely consumed by reaction, the resulting reaction mixture is reacted with the dibasic acid or mixture of dibasic acids. The esterification is performed directly upon the mixture of reaction products but, if desired, some of the allylic alcohol may first be removed by low-temperature distillation.

The esterification is preferably carried out at an elevated temperature, e. g., at a temperature from 50° to 120° C., since use of such temperatures promotes the reaction, and preferably is conducted in the presence of an acidic catalyst, e. g., p-toluene sulfonic acid or sulfuric acid, except when methallyl alcohol is present. Esterification preferably is further accelerated by providing means for removal of the water formed during the reaction; this may be accomplished in a manner known per se, for example by provision for removal of the water as formed by azeotropic distillation. The resulting esterified mixture, after neutralization, is ready for direct use in the polymerization. Neutralization may be effected by washing with dilute aqueous alkali metal hydroxide solution or by mixture with an alkaline earth metal hydroxide or carbonate followed, if desired, by refluxing, and subsequent filtration to remove insoluble matter.

Any alpha-ethylenic aliphatic dicarboxylic acid may be used in the practice of my invention. I usually prefer to use the $C_4$ acids, namely, fumaric acid or maleic acid or a mixture thereof, but I may use any other alpha-ethylenic alpha, beta-dicarboxylic acid such as itaconic, mesaconic, citraconic, etc. Where reference is made herein to dicarboxylic or dibasic acids, it will be understood that their anhydrides are contemplated as the full equivalents of the acids themselves.

By proceeding in the manner thus far outlined, the allylic alcohol and the oxirane react together to give a reaction mixture containing substantial amounts of an oxy-alcohol having the formula

$$CH_2=CX-CH_2-OCHX'-CHX''-OH$$

and substantial amounts of an oxy-alcohol having the formula $CH_2=CX-CH_2-(OCHX'-CHX'')_2-OH$, and usually also containing considerable unreacted allylic alcohol. The reaction mixture also contains small amounts of oxy-alcohols having the formula

$$CH_2=CX-CH_2-(OCHX'-CHX'')_n-OH$$

in which n is greater than 2 but not over 5. Upon esterification of this alcohol mixture, with or without removal of a portion of the unreacted alcohol, with the ethylene-alpha-beta-dicarboxylic acid, there is obtained a mixture of esters of the several alcohols present in proportions corresponding generally to the proportions of the various alcohols in the alcohol mixture subjected to esterification.

The air-drying properties of the soluble unsaturated resin obtained upon polymerization of the ester mixture are largely attributable to the presence in the alcohol mixture of substantial amounts of oxy-alcohols of the above formula wherein n is equal to 1 and wherein n is equal to 2. I use such conditions (which conditions will be readily apparent to those skilled in the art from this specification) as will result in the formation of an alcohol mixture in which the oxy-alcohols present consist predominantly of alcohols of the above formula in which $n$ has the values 1 and 2, and I use in the esterification step a mixture of alcohols containing at least 15 mol-percent of oxy-alcohols of the above formula in which $n$ has the values 1 and 2. The oxy-alcohol in which $n$ equals 1 usually predominates, often by a mol ratio of 2:1 to 4:1, over the oxy-alcohol in which $n$ equals 2.

In the typical practice of my invention, first reacting allyl alcohol with ethylene oxide in a molar ratio of from 1.8:1 to 1.9:1 and then reacting the resulting alcohol mixture with fumaric acid in a ratio of alcohol moles to acid equivalents of from 1.4:1 to 1.6:1, the resulting ester mixture was found to consist of 60–65 mol-percent of allyl, 22–26 mol-percent of allyloxyethyl ($n=1$), 6–9 mol-percent of allyloxyethoxyethyl ($n=2$), and from 2–5 mol-percent of more highly condensed allyloxy-polyethoxy-ethyl radicals in all possible combinations with fumaric acid (i. e., many mixed fumarate esters are present). Thus the content of radicals

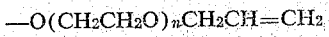

in which the value of $n$ was greater than 2 was only 2–5% of the entire mixture including allyl itself. Comparable results are obtained when other unsaturated dibasic acids, e. g., maleic or a mixture of maleic and fumaric acids, are used.

It is noteworthy that the soluble, unsaturated polymer obtained by following the principles set forth herein differs greatly from a corresponding polymer of the di-ester of the allylic alcohol with the dibasic acid in that my polymer will air dry. Those skilled in the art will appreciate that the polymer made by my invention does not contain such a high proportion of esterified allylic groups as to destroy its air-drying capability. In the light of this specification skilled workers can readily select suitable proportions of allylic alcohol and oxirane and can so carry out the various steps as to produce the new results which I have described.

For purposes of repressing gelation of the polymerizing esters and securing high yields of soluble, convertible, air-drying resin, the allylic alcohol added prior to polymerization may be replaced in whole or in part by the corresponding allylic chloride, allylic monoether of a saturated alcohol, or allylic mono-ester of a saturated monocarboxylic acid. All of these gelation suppressers may be represented by the formula $CH_2=CX-CH_2-Z$ where X is either hydrogen, chlorine, methyl or ethyl, and Z is one of the radicals hydroxyl, chlorine, alkoxy (e. g., methoxy, ethoxy, beta-hydroxyethoxy, n-propoxy, isopropoxy, n-butoxy, isobutoxy, amyloxy, hexoxy, heptoxy, octoxy, nonoxy, decoxy, etc.), aryloxy (e. g., phenoxy, tolyloxy), aralkoxy (e. g., benzyloxy, and non-enic monocarboxylic acyloxy (e. g., acetoxy, propionoxy, isobutyroxy, valeroxy, benzoyloxy). Illustrative of such compounds are allyl chloride, methallyl chloride, 2,3-dichloropropene, allyl alcohol, methallyl alcohol, 2-chloroallyl alcohol, 2-ethylallyl alcohol, allyl methyl ether, methallyl ethyl ether, beta-allyloxyethanol, allyl propyl ether, methallyl butyl ether, methallyl amyl ether, methallyl heptyl ether, allyl octyl ether, 2-chloroallyl ethyl ether, methallyl phenyl ether, allyl benzyl ether, allyl acetate, 2-chloroallyl propionate, methallyl butyrate, and ethallyl valerate. Among such allylic compounds the alcohols and chlorides are generally the most effective in repressing gelation of the polymerizable esters, while the corresponding allylic mono-ethers and mono-esters yield interpolymers of greater softness, flexibility and resistance to hydroxylic solvents. All of these allylic compounds interpolymerize with the dibasic acid esters during polymerization thereof.

Certain other interpolymerizable monoolefinic compounds can be employed as gelation-preventing agents in place of the above-mentioned allylic compounds, viz., crotonaldehyde; acyclic monoolefinic hydrocarbons of from 4 to 16 carbon atoms, particularly those having a terminal methylene group such as 1-pentene, 2,2,4-trimethyl-1-pentene, and 1-octene, and $C_3$ to $C_5$ trichloroalkenes having a trichloromethyl group, e. g. 3,3,3-trichloropropene, 4,4,4-trichloro-1-butene, and 4,4,4-trichloro-2-methyl-1-butene. Such compounds copolymerize with the esters to give markedly improved conversions of the latter to the soluble, interpolymeric, air-drying form. The trichloroolefin copolymers also display considerable flame-resistance.

I have further discovered that two other classes of compounds devoid of olefinic unsaturation, when present during the ester polymerization, will react with the polymerizable ester products to avert or delay gelation and give a high yield of soluble, unsaturated, air drying resin.

The first such class of compounds comprises polyhalogenomethanes containing at least one bromine atom and at least two additional halogen atoms selected from the group consisting of bromine and chlorine, viz., bromotrichloromethane, dibromodichloromethane, tribromomethane, dibromochloromethane, bromodicholoromethane, tribromochloromethane, and carbon tetrabromide. The use of these compounds as gelation-suppressors for purified polymerizable esters is described in my copending applications Serial No. 761,741 filed July 17, 1947 (now U. S. Pat. 2,547,701) and Serial No. 194,930 filed November 9, 1950 (now U. S. Pat. 2,636,874). As I have disclosed therein, I may use between 5% and 250% of the polyhalogenomethane, based on the ester content of my crude ester mixture, and preferably between 35% and 100%.

The second such class of gelation-suppressors comprises the alkanethiols such as ethanethiol, 1,1-dimethylethanethiol, hexane-1-thiol, and dodecane-1-thiol. These compounds are most efficacious when added incrementally or continuously to the mixture during polymerization. I may use between 0.005 and 0.2 mol of the alkanethiol per mol of ester in my crude mixture.

The word "soluble," as used herein, denotes solubility in the ordinary organic solvents typified by acetone.

Each of the above-mentioned gelation-suppressing compounds combines chemically with the esters during polymerization and is present in combined form in the soluble polymer produced. They not only serve during polymerization to delay gelation but also insure an increased conversion of the ester mixture to the soluble polymeric form. However, the properties of the polymers or interpolymers obtained can be further modified, e. g., as to hardness, color stability, flexibility and water-sensitivity, by copolymerization of the ester mixture with a monoolefinic compound of the type $X^0Y^0C=CHZ^0$ where $Z^0$ is hydrogen or carbalkoxy; $Y^0$ is hydrogen, methyl, chlorine or carbalkoxymethyl, and $X^0$ is aryl, chlorine, acyloxy, acyl, carbalkoxy, alkoxy, methyl, carbonitrilo, carboxyl, provided that, when $Y^0$ is carbalkoxymethyl, $X^0$ is carbalkoxy; and provided also that, when both $X^0$ and $Z^0$ are carbalkoxy, $Y^0$ is then only hydrogen, chlorine, or methyl. Illustrative of such compounds are styrene, alpha-methylstyrene p-methyl styrene, vinyl chloride, vinylidene chloride, vinyl butyrate, methyl vinyl ketone, n-butyl acrylate, methyl methacrylate, methyl alpha-chloroacrylate, vinyl n-butyl ether, isopropenyl methyl ether, isobutylene, acrylonitrile, methacrylonitrile, acrylamide, dibutyl fumarate, dimethyl mesaconate, dimethyl citraconate, dihexyl itaconate. The copolymerization with an olefin hydrocarbon such as styrene, vinylnaphthalene or isobutylene yields resins of improved compatibility with cheap hydrocarbon solvents, an important factor in the formulation of commercial surface coatings. Copolymerization with styrene is especially advantageous. Copolymerization with halogenated monoolefinic compounds such as vinyl chloride, vinylidene chloride and the dichlorostyrenes yields polymeric materials of increased flame-resistance and often of greater hardness. The latter property can also be enhanced by copolymerization with olefinic acid nitriles, amides and imides, e. g., acrylonitrile and methacrylamide. On the other hand, softer and more flexible products can usually be obtained by the copolymerization with olefinic acid esters of alkanols, such as the acrylates, methacrylates, maleates, fumarates, itaconates, mesaconates and aconitates, particularly such esters derived from alkanols containing a chain of two or more carbon atoms, e. g., ethanol, n-butanol, 2-ethylhexanol and octanol.

The copolymerizable monoolefinic compounds just described are usually employed in amounts ranging from 0 to 2 moles per mole of the mixture of polymerizable esters, since, though larger amounts, e. g., 2–6 moles, are operable, the curing time of the resulting copolymers is prolonged in many cases and the valuable air-drying property of such resins is markedly diminished.

The polymerization of the ester mixture is carried out at temperatures ranging from 25° to 150° C., particularly at from 60° to 100° C., in the presence or absence, but preferably in the presence, of at least one compound from the above-described class of allylic alcohols, chlorides, mono-ethers and mono-esters, or crotonaldehyde, olefinic hydrocarbons of 4–16 carbon atoms, trichloroalkenes having from 3 to 5 carbon atoms and a trichloromethyl group, alkanethiols, and polyhalogenomethanes having at least one bromine atom and at least two additional bromine or chlorine atoms, and in the presence or absence of at least one copolymerizable monoolefinic compound of type $X°Y°C=CHZ°$, as defined above.

The polymerization is catalyzed by compounds capable of decomposing to form free radicals at the polymerization temperatures mentioned above; e. g., peroxides, such as acetyl peroxide, benzoyl peroxide, tert.-butyl hydroperoxide, and diazo compounds, such as azobis isobutyronitrile.

The course of the polymerization can be followed by observing the increase in the viscosity of the reaction mixture. In cases where the polymerization is conducted in the presence of a copolymerizable allylic compound as set forth above, the resulting soluble, unsaturated resin can be isolated, from the reaction mixture by removal of unreacted starting materials through distillation or preferential extraction. The resin can then be employed as a thermosetting molding resin, or it can be dissolved in appropriate solvents, e. g., acetone and xylene, and employed as a coating, laminating or impregnating composition. One particularly suitable group of solvents are the normally liquid olefinic copolymerizable compounds such as styrene, tolyl acrylate, butyl acrylate, methyl methacrylate, and diethyl fumarate, which yield solutions of the resins that are capable of total polymerization, leaving no solvent to be evaporated and giving off no volatile reaction products during polymerization. Such solutions are particularly useful in applications where a minimum of shrinkage in the final product is required or where evaporation of a solvent constitutes a technical hazard.

For most commercial applications, however, it is unnecessary to isolate my soluble unsaturated interpolymers. Indeed the crude interpolymerization reaction mixture can itself be further polymerized to the insoluble heat-resistant state, preferably after removal of any unreacted monomeric allylic compound. The mixture can be thinned with solvents, or mixed with liquid copolymerizable olefinic compounds, and with various inert addends such as dyes, pigments, fillers and plasticizers.

Application of heat, e. g., at temperatures of 60–150° C., to compositions containing my interpolymers induces further polymerization whereby solvent- and heat-resistant products are obtained. This cure can also be effected at temperatures as low as room temperature, i. e., ca. 25° C., in the presence of conventional driers such as the naphthenates of cobalt, manganese or lead, which renders my interpolymers of particular interest to the field of surface-coatings. The resins of my invention, when used in surface coating compositions, are equivalent or superior in all properties to the simple di (allyloxyalkyl) fumarate (or like ester) resins. Resins prepared as in the examples below were evaluated against the best commercial wood finishes in standard tests and were found superior to all such finishes in gloss, flexibility and in resistance to non-aqueous chemicals. The non-styrene resins were superior to urea-alkyd finishes in water and soap resistance but somewhat inferior to varnish and lacquer. The styrene formulated resins largely overcame this slight deficiency.

The following examples disclose my invention in more detail. All parts are by weight.

Example 1

One hundred and sixty-six parts of ethylene oxide vapor are introduced into 406 parts of vigorously agitated allyl alcohol at 60–80° C. during two hours. The reaction is promoted by the presence of 7 parts of boron trifluoride etherate. The reaction mixture is then heated for one additional hour at 80–90° C.

Esterification of the alcohols thus produced is accomplished by cooling the mixture and adding 280 parts of fumaric acid, together with 2 parts of p-toluenesulfonic acid as catalyst, and 250 parts of benzene which serves as an entraining agent to remove the water formed during the reaction. The mixture is heated at reflux and in a nitrogen atmosphere for 30 hours during which time the theoretical amount of water is formed and is continuously removed from the reaction mixture by azeotropic distillation. At the end of this time the reaction mixture is neutralized by agitation with 10 parts of barium hydroxide for 1 hour and is filtered to remove the insoluble salts thus formed.

The filtered reaction mixture is then mixed with 400 parts of allyl alcohol and copolymerized by heating at reflux for 48 hours during which time 4 parts of benzoyl peroxide is added incrementally in four portions at 0, 5, 10, and 15 hours of reaction time respectively. At the end of the reaction, any unreacted allyl alcohol is removed by azeotropic distillation with xylene, leaving ca. 600 parts of viscous solution from which about 450 parts of solid resin can be isolated by precipitation with a mixture of n-hexane and diethyl ether.

Approximately 14.7 parts of the solid resin, in solution in xylene, are mixed with 0.147 part of cobalt, as cobalt naphthenate, 7.5 parts of xylene and 4.1 parts of n-butanol. The solution is spread on a wood panel and becomes tack-free after about 1.5 hours at 25° C. When baked on wood for 1.5 hours at 60° C., a similar film displays high resistance to attack by acetone and xylene. Even when baked at 200° C., the film shows but little, if any discoloration.

Example 2

(a) Two hundred and eighty-six parts of the alcohol mixture prepared from ethylene oxide and allyl alcohol, as in Example 1 above, is mixed with 70.0 parts of fumaric acid, 59.0 parts of maleic anhydride, about 200 parts of benzene and 2.0 parts of p-toluenesulfonic acid. The mixture is heated at reflux in an atmosphere of nitrogen for about 30 hours during which time the water formed in the reaction is removed by azeotropic distillation.

(b) One hundred and fifty-nine parts of the crude reaction product of Example 2(a) is neutralized with calcium hydroxide, filtered, and then added to 100 parts of allyl alcohol. In order to effect copolymerization, the mixture is refluxed for a total of 50.0 hours, 2 parts of benzoyl peroxide being added in 4 equal increments at 0, 5, 10 and 15 hours of reaction time. Unreacted allyl alcohol is then removed by azeotropic distillation with xylene, and about 232 parts of resin can be obtained from the residual viscous solution by precipitation with a mixture of hexane and diethyl ether.

Seventeen and two tenths parts of the above copolymer solution in xylene is mixed with 0.8 part of a 1% solution of cobalt naphthenate in xylene and 5 parts of an 80:20 mixture of xylene and butanol. The solution is applied to a wooden veneer panel in three coats which are cured respectively for 2, 1 and 1.5 hours at 60° C. to yield an adherent coating impervious to attack by acetone and xylene.

*Example 3*

In the manner of Example 1, 287 parts of ethylene oxide is added to 703 parts of allyl alcohol at 60° C. in the course of 1.5 hours and in the presence of 18.8 parts of 96.7% sulfuric acid. After all of the ethylene oxide has been added, the reaction mixture is refluxed for an additional hour.

A mixture of 994 parts of the resulting mixture of alcohols, 471 parts of fumaric acid and 467 parts of toluene is heated at reflux for 3.5 hours during which time the water formed in the reaction is removed continuously by azeotropic distillation. The solution is then neutralized by the addition of an excess of calcium carbonate (36.6 parts), and, after heating at reflux for about 0.5 hour, the mixture is filtered to remove the insoluble calcium salt.

To 524 parts of the filtrate is added 248 parts of allyl alcohol and 5.45 parts of benzoyl peroxide. The mixture is copolymerized by heating at reflux for 16.5 hours, after which it is cooled, and a 700-part portion is withdrawn from the reaction mixture and evacuated at 45° C. and 23 mm. to yield 449 parts of resin. The latter is dissolved in a sufficient amount of a 1:4 (by weight) butanol-xylene mixture to form a 40% resin solution. To the solution is added 0.2% by weight of cobalt (in the form of xylene solution of cobalt naphthenate) and a film therefrom on glass is converted by heating at 60° C. for 1 hour or at 25° C. for 24 hours, to a clear, hard, flexible state in which it is insoluble in acetone and xylene.

*Example 4*

Nine hundred and fifty-one parts of ethylene oxide is passed into 2323 parts of allyl alcohol during 1.6 hours at 60° C., in the presence of 40 parts of boron trifluoride etherate complex as catalyst. After all of the ethylene oxide is added, the reaction mixture is heated at reflux for one additional hour and subsequently cooled. The solution is neutralized, after standing over-night, by the addition of 71 parts of calcium carbonate. The mixture is then heated at reflux for 0.5 hour and filtered.

A mixture of 331 parts of the filtered alcohol solution, 160 parts of fumaric acid, 159 parts of toluene and 4.6 parts of 97% sulfuric acid is heated at reflux for 1.5 hours. The water formed in the reaction is removed by continuous azeotropic distillation. The reaction mixture is then neutralized by the addition of 13.2 parts of calcium carbonate, and is filtered hot after refluxing 0.5 hour.

(*a*) A mixture of 11.44 parts of the filtered ester, 2.74 parts of styrene, 8.54 parts of allyl alcohol, 1.28 parts of toluene and 0.17 part of benzoyl peroxide is heated at 90° C. for 18 hours. A 1.674-part portion of the resulting polymer solution is evacuated to yield 0.62 part of soluble interpolymer as residue. Another portion of the polymer solution is blended with 0.2% by weight of cobalt "drier" (cobalt naphthenate) and cured to a clear, hard, acetone-insoluble film by baking on glass at 60° C. for 1 hour.

(*b*) Similarly, a mixture of 14.75 parts of the original ester solution, 0.88 part of styrene, 7.96 parts of allyl alcohol, 0.41 part of toluene and 0.17 part of benzoyl peroxide is heated at 90° C. for 1 hour. A 1.763 part portion of the resulting resin solution yields 0.651 part of soluble interpolymer upon evacuation. Another portion is cured to a hard, clear, solvent-resistant film by heating at 60° C. for 1 hour in the presence of 0.2% by weight of cobalt "drier."

Having thus described my invention, what I claim and desire to protect by Letters Patent is:

1. The method of making a soluble, unsaturated, air-drying, polymeric resin which comprises polymerizing, at a temperature of from 25° to 150° C. in the presence of allyl alcohol as a gelation suppressor and a free radical polymerization catalyst, a mixture of esters obtained by esterifying an aliphatic alpha-ethylenic alpha, beta-dicarboxylic acid in amount such that the ratio of moles of alcohols furnished by the mixture of alcohols hereinafter mentioned to acid equivalents supplied by said acid is from 1.3:1 to 2.0:1 at a temperature of from 50° to 120° C. with a mixture of alcohols formed by reacting allyl alcohol and ethylene oxide in a molar ratio of alcohol to oxide of from 1:1 to 5:1 at a temperature of from 40° to 100° C. in the presence of an ionic catalyst, and continuing said polymerizing step until a major proportion of said mixture of esters has been converted to a soluble, unsaturated, air-drying, polymeric resin.

2. The method of claim 1 wherein the ratio of moles of alcohols to acid equivalents supplied by said acid in said esterifying step is from 1.4:1 to 1.6:1 and wherein the molar ratio of allyl alcohol to ethylene oxide in said reacting step is from 1.8:1 to 1.9:1.

3. The method of claim 1 wherein said acid is fumaric acid.

4. The method of claim 1 wherein said acid is a mixture of fumaric and maleic acids.

5. An air-drying resin prepared by the method of claim 1.

References Cited in the file of this patent

UNITED STATES PATENTS

| | | |
|---|---|---|
| 2,273,891 | Pollack et al. | Feb. 24, 1942 |
| 2,321,942 | Rothrock | June 15, 1943 |
| 2,384,568 | Semon | Sept. 11, 1945 |
| 2,431,373 | D'Alelio | Nov. 25, 1947 |
| 2,444,655 | Krocker et al. | July 6, 1948 |
| 2,514,786 | Neher et al. | July 11, 1950 |
| 2,594,825 | Tawney | Apr. 29, 1952 |
| 2,628,922 | Carlin | Feb. 17, 1953 |